April 30, 1935.  C. E. SWENSON  1,999,487
UNIVERSAL JOINT
Filed July 11, 1932
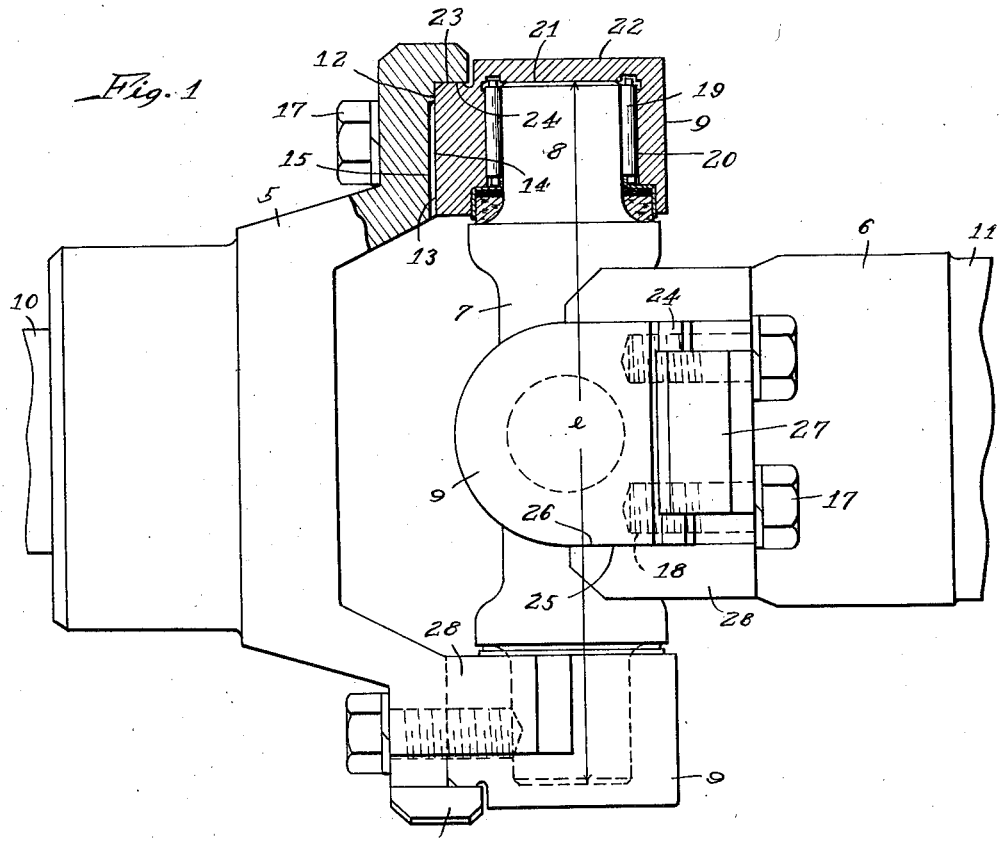
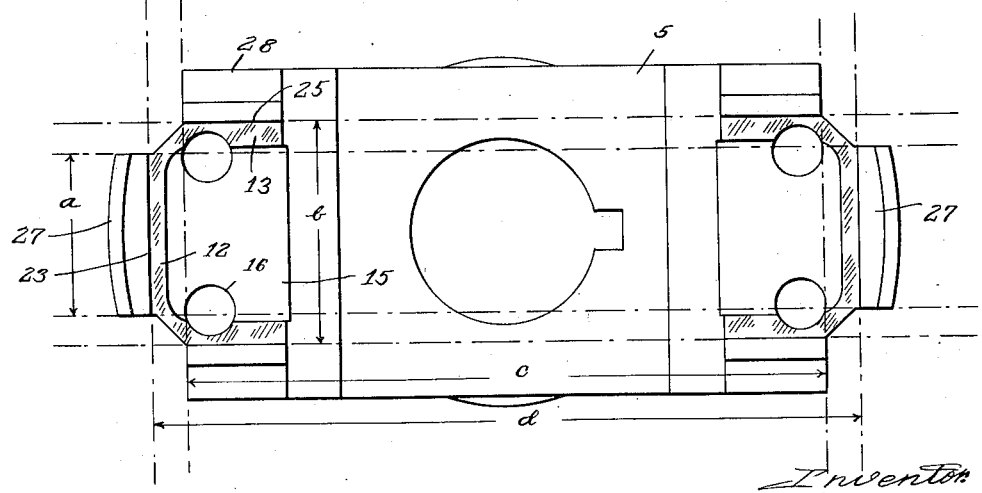
Inventor
Carl E. Swenson
By Wilson, Dowell, McCanna & Rehm
Attys.

Patented Apr. 30, 1935

1,999,487

UNITED STATES PATENT OFFICE 1,999,487

UNIVERSAL JOINT

Carl E. Swenson, Rockford, Ill., assignor, by mesne assignments, to Borg-Warner Corporation, Chicago, Ill., a corporation of Illinois Application July 11, 1932, Serial No. 621,798

3 Claims. (Cl. 64—102)

This invention relates to an improved trunnion type universal joint.

One object of my invention is to provide bearing blocks to be fastened to the yoke members and to fit on the trunnions of the intermediate spider member, and yokes having shoulders machined thereon tangent to a circle of a predetermined radius with respect to the shaft center for abutment by end thrust surfaces formed on the blocks, the yokes also having lateral shoulders machined thereon parallel with the aforesaid radius for abutment by surfaces formed on the blocks, whereby to assume side thrust in the transmission of torque from the one yoke to the other. The abutment of the blocks with the shoulders on the yoke members relieves the block fastening means of load incident to end thrust and torque in the operation of the universal joint.

Another object of my invention lies in so constructing the joint to permit more economical production by a novel method of machining the shoulders on the yoke members, consisting in simultaneously milling portions of flat seats on the yoke members in a plane at right angles to the planes of the shoulders, and in simultaneously milling with two cutters, the end thrust shoulders in one operation and the other shoulders in another operation, both arms of the yoke being machined in one set-up, longitudinally for the side thrust shoulders, and transversely for the end thrust shoulders. Thus, the end thrust shoulders are assured of proper spacing with respect to each other so that the proper clearance will be provided between the ends of the trunnions and the end thrust bearing surfaces in the blocks, assuming that the blocks are accurately made with their external end thrust surfaces properly related to the internal end thrust bearing surfaces. Furthermore, the method makes for accurate centering of the group of bearings with respect to the shafts and accordingly is a step toward more accurate dynamic balance.

The invention is illustrated in the accompanying drawing, in which—

Figure 1 is a side view of a universal joint made in accordance with my invention showing one of the bearings in longitudinal section, and Fig. 2 is a face view of one of the yoke members with the bearing blocks removed therefrom, and indicating in dotted lines the paths of the cutters.

The same reference numerals are applied to corresponding parts throughout the views.

The universal joint illustrated, briefly stated, consists of a pair of yokes or terminal coupling members 5 and 6 connected by means of an intermediate transmission member 7, often referred to as the spider, the same providing four trunnions 8, 90° apart. The trunnions are received in bearing blocks 9, each yoke being equipped with one pair of these bearings in diametrically opposed relation. The yokes 5 and 6 are suitably connected to driving and driven members, the yoke 5 in this instance turning with a shaft 10, and the yoke 6 with a shaft 11. The spider 7 may serve as a lubricant reservoir in the usual way to supply lubricant to the trunnion bearings through radial holes provided in the trunnions and communicating with the reservoir.

The yokes 5 and 6 are preferably machine finished on all surfaces so as to have a true dynamic balance. The surfaces 12—13 provide smooth seats for abutment by flat faces 14 provided on the backs of the blocks 9. The areas 15 bounded by the seats 12—13 on three sides are depressed so that the seats are narrow and very little machine work is required to provide smooth seats for the blocks, as will appear hereinafter in the discussion of the method of manufacture. The yoke members have holes 16 bored therein to receive bolts 17 which thread in holes 18 provided in the bearing blocks, whereby to clamp the blocks to the yoke members. The holes 16 are purposely made slightly larger than the diameter of the bolts 17 because they are not intended to affect the location of the bearing blocks, but simply accommodate the bolts for clamping the blocks to the yokes, the location of the blocks being accurately determined in another way in accordance with the present invention, as will soon appear.

The bearing blocks 9 may be constructed to provide any suitable or preferred type of bearings so far as the present invention is concerned. Thus I have shown anti-friction rollers 19 which make for easier and smoother operation than plain journal bearings, and, consequently, more efficient power transmission and longer life. These rollers run on the side of the trunnions 8 on the one hand, and on the other hand, have bearing contact with the side wall 20 of the cylindrical bearing recess provided in the blocks. The rollers are suitably retained in the blocks so that each block with its complement of rollers is a unit which may be removed and replaced with facility, for inspection, repair or replacement. Suitable packing means is provided on each bearing to seal the same against loss of lubricant or entry of dirt and water. Each bearing, in addition to providing lateral bearing support for its trunnion, has a bearing surface 21 provided on the inside of the end wall 22 thereof to assume end thrust.

In accordance with one phase of my invention, I provide shoulders 23 on the yokes 5 and 6 for engagement with end thrust surfaces 24 on the bearing blocks 9. The surfaces 24 are properly related to the end thrust bearing surfaces 21 so that the ends of the trunnions will have a predetermined clearance with respect to the surfaces 21 when the blocks are mounted on the yokes with the surfaces 24 in engagement with the shoulders 23. This arrangement manifestly relieves the block fastening means 17 of any load incident to end thrust. The bolts 17, in other words, simply clamp the blocks 9 to the yokes. The reason for making the bolt holes 16 in the yokes larger than the diameter of the bolts 17 must now be apparent; it allows the bearing blocks to be shifted slightly with respect to the yokes to bring the surfaces 24 into tight engagement with the shoulders 23. Also in accordance with this phase of my invention, I provide lateral shoulders 25 on the yokes 5 and 6 for engagement with side thrust surfaces 26 on the bearing blocks 9. It is evident from inspection of Figure 1 that the shoulders 25 have engagement with the surfaces 26 up to a plane running through the centers of the trunnions, so that the blocks 9 are solidly supported and there is no perceptible cantilver action to affect the fastening of the blocks to the yoke members. In other words, the torque load is in no way imposed upon the bolts 17 but is assumed entirely by the metal to metal contact described between the blocks themselves and the yoke members. The fact that the bolt holes 16 are larger in diameter than the bolts 17 avoids any interference with the blocks being disposed with the surfaces 26 in snug engagement with the shoulders 25.

The other phase of my invention has to do with the novel method of manufacture to make for speedier production and consequently lower cost, and at the same time make for accurate centering of the group of bearings with respect to the shafts 10 and 11 for more accurate dynamic balance, as well as to insure proper clearance between the ends of the trunnions 8 and the end thrust bearing surfaces 21. In carrying out this method it will be observed in Fig. 2 that the end thrust shoulders 23 are provided on a pair of diametrically opposed lugs or jaw portions 27 formed on the two arms of the yoke member, and that these lugs are narrower than the dimension between the side thrust shoulders 25, which are formed on two pairs of lugs or jaw portions 28 formed on the sides of the two arms of the yoke member. That is to say, the dimension $a$ is sufficiently smaller than the dimension $b$ so that the seats 13 and shoulders 25 may be machined by a pair of narrow milling cutters fed past the sides of the lugs 27 lengthwise of the end of the yoke member. In a similar manner the dimension $c$, measured from the outer side of one lug 28 to the outer side of the diametrically opposite lug 28, is sufficiently smaller than the dimension $d$, measured from one end thrust shoulder 23 to the diametrically opposite shoulder 23, so that a pair of narrow milling cutters may be fed past the sides of the lugs 28 to simultaneously mill the seats 12 and end thrust shoulders 23. In other words, only two milling operations are required to machine the seats 12—13 and the shoulders 23 and 25. The shoulders 23 are, of course, at the same distance from the shaft center and both are tangent to a circle having a radius measured from the shaft center out to the shoulders. Consequently, assuming that the bearing blocks 9 are accurately made, the bearings will be accurately centered as a group with respect to the shafts 10 and 11 when they are mounted on the yoke members 5 and 6 with their end thrust surfaces 24 in abutment with the shoulders 23. Then, too, assuming that the end thrust bearing surfaces 21 in the blocks 9 have been produced in proper relation to the end thrust surfaces 24, with due regard to the dimension $e$ measured from the end of one trunnion 8 to the end of the diametrically opposite trunnion, the proper clearance will be provided between the ends of the trunnions and the end thrust bearing surfaces cooperating therewith, whereby to have smooth and quiet operation and minimum wear. In line with the disclosure in my copending application, Serial No. 615,496, filed June 6, 1932, the blocks 9 may have their surfaces 24 produced thereon in proper relation to the end thrust bearing surfaces 21 by mounting the blocks on a fixture similar to the spider 7 but having posts large enough to fit snugly in the cylindrical bearing recess 20, the fixture being simply indexed for one operation after another. If this fixture has the posts from one to five thousandths longer than the trunnions 8, according to the clearance which it is ultimately desired to secure between the ends of the trunnions 8 and the surfaces 21, it will be evident that when the blocks 9 are subsequently assembled on the yoke members, the proper clearance will be provided at the ends of the trunnions when the surfaces 24 on the blocks are in engagement with the shoulders 23. However, there are any number of practical methods of producing the surfaces 24 exactly in a predetermined relation to the surfaces 21 to insure the desired clearance at the point referred to.

It is believed the foregoing description conveys a clear understanding of all of the objects and advantages of my invention. The appended claims have been drawn so as to cover all legitimate modifications and adaptations.

I claim:

1. A universal joint comprising driving and driven yoke members, an intermediate spider member having trunnions, cup-shaped bearing blocks for said trunnions having end walls engaging the ends of said trunnions to assume end thrust and having flat faces arranged for abutment with flat seats provided on the yoke members where the blocks are arranged to be detachably secured to said yoke members, jaw portions on the yoke members projecting on opposite sides of said seats to have abutment with the opposite sides of the bearing blocks to assume side thrust in operation, other projecting portions on the yoke members in transverse relation to said jaw portions at the outer ends of said seats for abutment with surfaces provided on said blocks to assume end thrust in operation, and means for fastening the bearing blocks to said yoke members, said jaw portions extending out from the yoke members approximately to a plane passing through the centers of the trunnions of the spider member, whereby to eliminate cantilever action of the bearing blocks and accordingly relieve the bearing fastening means of load.

2. A universal joint comprising driving and driven yoke members, an intermediate spider member having trunnions, bearing blocks for said trunnions having flat faces arranged for abutment with flat seats provided on the yoke members where the blocks are arranged to be detachably secured to said yoke members, projections on the yoke members on three sides of the flat seats provided thereon to have engagement with the bearing blocks to prevent movement thereof in three directions, namely, with the outer end of the bearing blocks to prevent endwise movement outwardly from the center of the yoke members and with opposite sides of the bearing blocks to prevent sidewise movement relative to the yoke members in either direction in the planes of rotation of the yoke members, the two side thrust projections being disposed with respect to the end thrust projection with the adjacent ends thereof spaced from one another so that the inner surface of any one of said projections and a portion of the seat adjacent thereto may be machined with a cutter fed lengthwise of said projection and past the end of a neighboring projection, and means for fastening the bearing blocks to the yoke members.

3. A universal joint as set forth in claim 2 wherein the yoke members are provided with depressed areas between the projections bounded by narrow seat portions next to the projections, whereby to minimize machining and enable complete machining of the seats in single passes of a cutter fed lengthwise of the inside surfaces of said projections.

CARL E. SWENSON.